Aug. 26, 1969  N. M. PACKARD ET AL  3,463,057
ARRANGEMENT OF CYLINDER AND PISTON IN ENGINE
Filed March 23, 1967  4 Sheets-Sheet 2
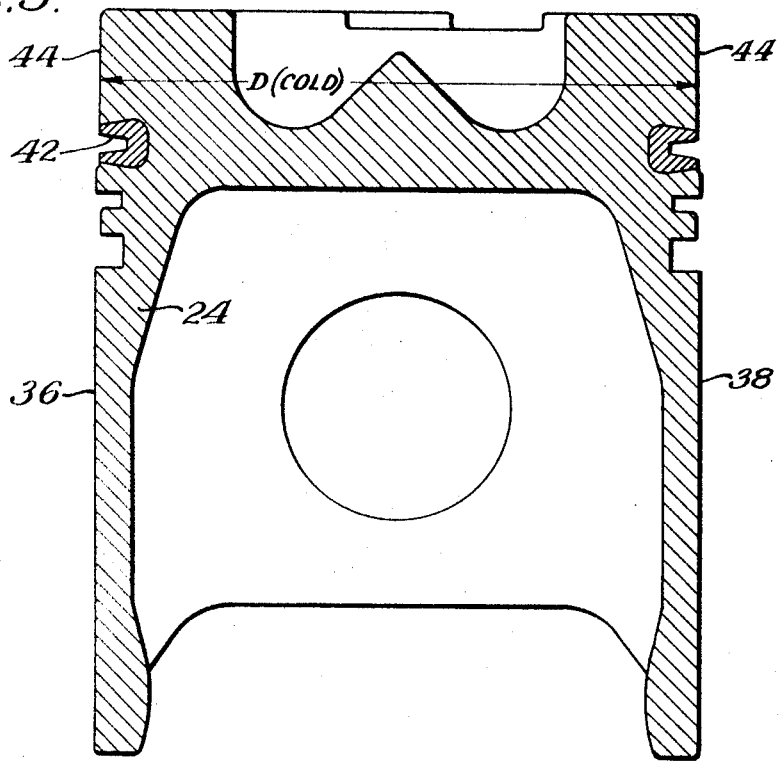
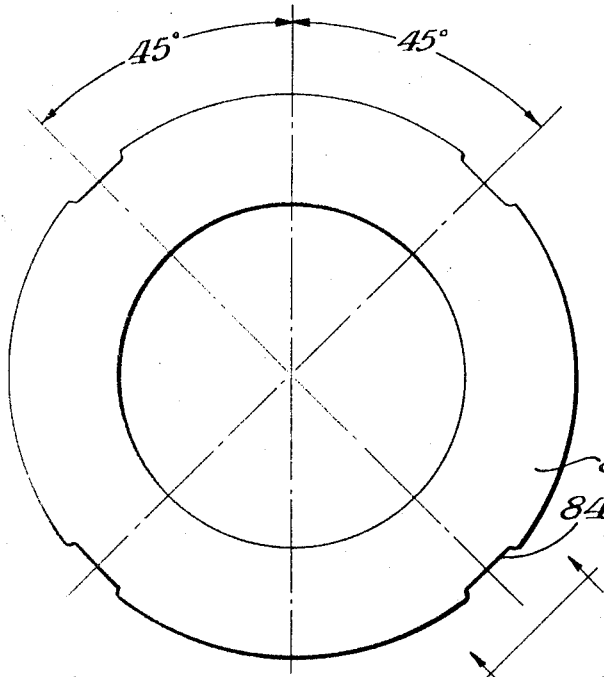
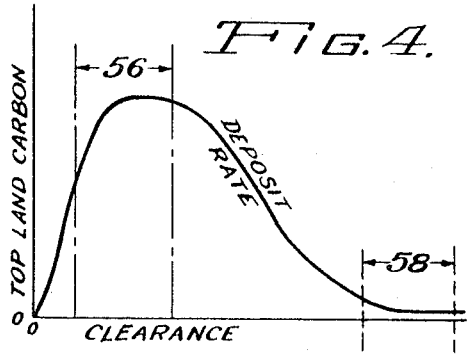
Inventors:
Norman M. Packard
Leonard O. Squinto
William Lenzi
By John W. Haines
Atty Aug. 26, 1969   N. M. PACKARD ETAL   3,463,057
ARRANGEMENT OF CYLINDER AND PISTON IN ENGINE
Filed March 23, 1967   4 Sheets-Sheet 3

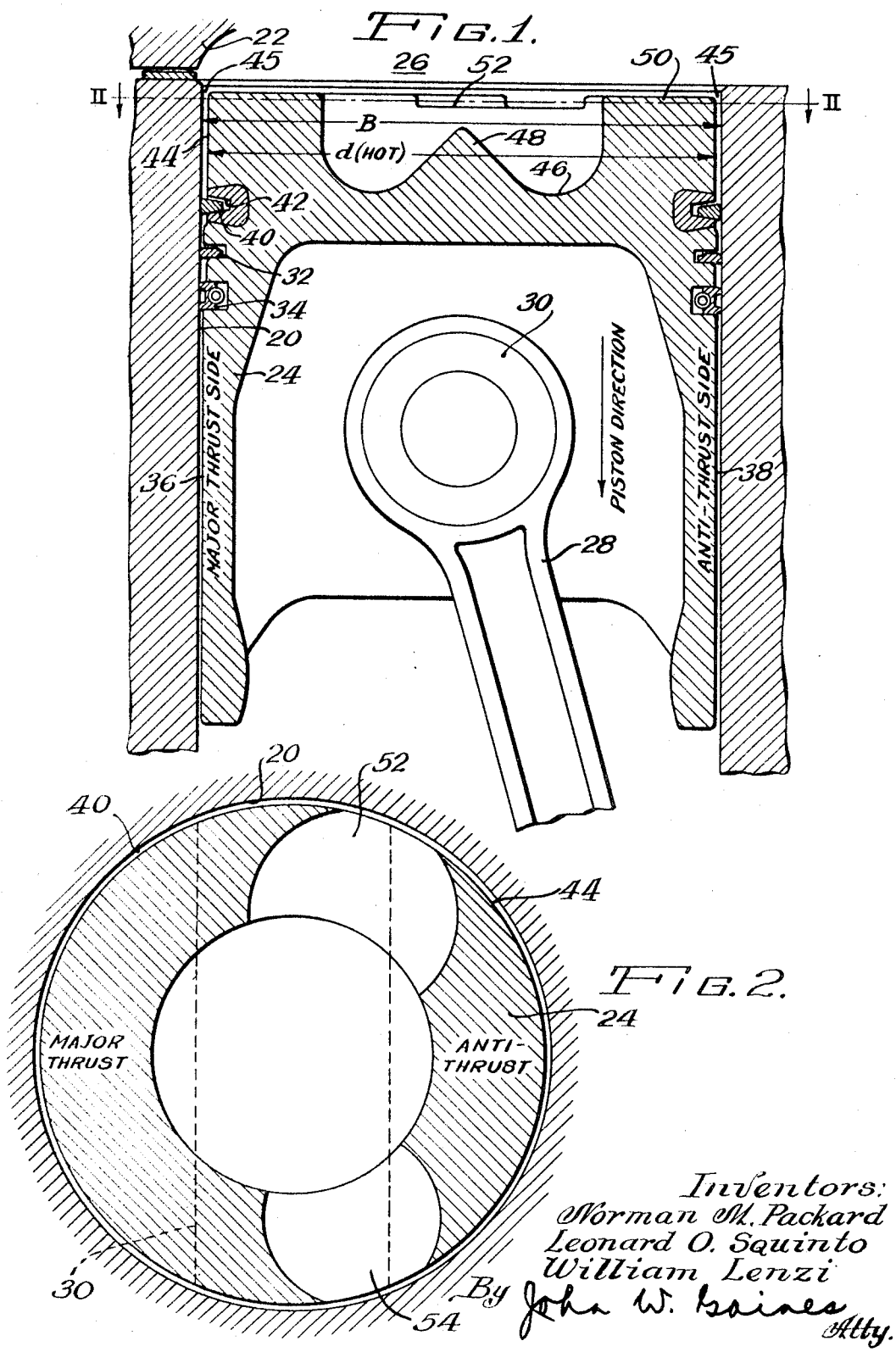

Inventors:
Norman M. Packard
Leonard O. Squinto
William Lenzi
By John W. Gaines
Atty Aug. 26, 1969        N. M. PACKARD ETAL        3,463,057
ARRANGEMENT OF CYLINDER AND PISTON IN ENGINE
Filed March 23, 1967                                4 Sheets-Sheet 4
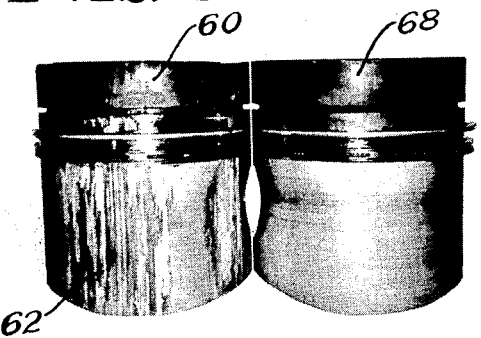
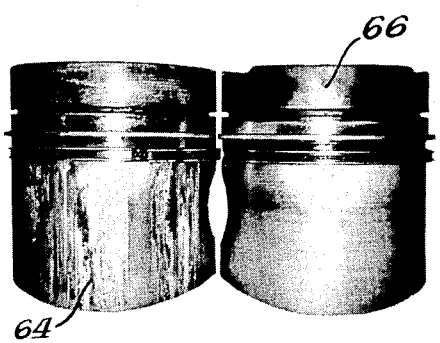
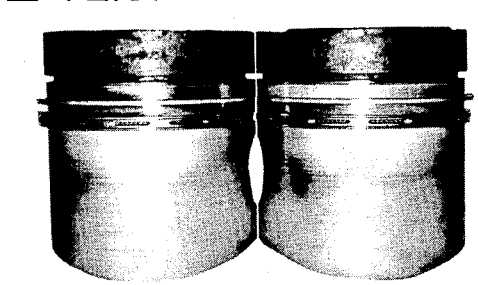
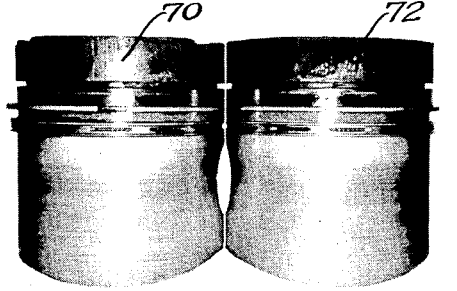
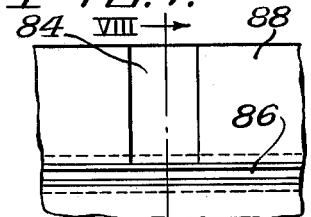
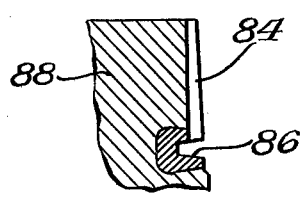
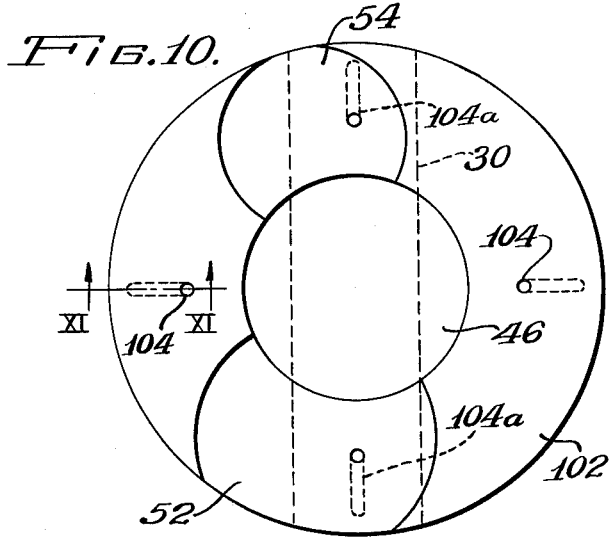
Inventors:
Norman M. Packard
Leonard O. Squinto
William Lenzi
By John W. Gaines
Atty.

United States Patent Office 3,463,057
Patented Aug. 26, 1969

3,463,057
ARRANGEMENT OF CYLINDER AND PISTON IN ENGINE
Norman M. Packard, Des Plaines, Leonard O. Squinto, Berwyn, and William Lenzi, Western Springs, Ill., assignors to International Harvester Company, Chicago, Ill., a corporation of Delaware
Filed Mar. 23, 1967, Ser. No. 625,352
Int. Cl. F16j 1/04
U.S. Cl. 92—233                                6 Claims

ABSTRACT OF THE DISCLOSURE

Internal combustion engine piston formed with a large setback of the top land to provide exaggerated piston clearance about the head of the piston. The setback creates an oversize annular orifice, leading to the top seal ring on the piston and insuring maintenance of a wide orifice path in which sufficiently high, carbon-burning temperatures can prevail to prevent adherent, unburned, load-bearing carbon from being formed and deposited about the piston head, and through which is afforded instant communication of substantially full combustion gas pressure to the top seal ring whereby radial force sufficient to seal will be developed in large part by gas load behind the top ring.

FIELD OF THE INVENTION

This application relates to the combustion chamber of in internal combustion engine. It particularly relates to a piston and a receiving cylinder defining such chamber, in which the top land setback of the piston is sufficiently far away from the cylinder wall that a large clearance orifice results which leads to the top one of the seal rings provided on the piston.

DESCRIPTION OF THE PRIOR ART

According to practice in the past, the available volume for accumulating carbon between the piston (hot) and the receiving cylinder is designed to be very thin in diesel engines and to be restrictive to a minimum of room for entry of carbon deposits about the piston. Therefore, it has been the practice to make provision that the hot, running fit is a close fit between the piston and the cylinder, especially adjacent the cylindrical head surface of the piston. Closer and closer fits have gradually become possible because manufacturing techniques have continued to improve and, with such improvement, the design tendency is moreso and moreso to seek closest possible fits.

The difficulty is that gas pressure loading of the top seal ring becomes impaired and top-ring sealing loses its effectiveness, due to the piston rocking or shifting to one side of the cylinder and having the piston head to block off gas access to the portion of the ring at that side, or due to accumulation locally of a layer of load-bearing carbon about the head of the piston to block off access to the portion of the top ring therebelow, or due to both occurrences. Minimizing the piston head-cylinder wall clearance to the extent that can be done by modern manufacturing practices accentuates the difficulty.

Our invention materially reduces or substantially eliminates the foregoing problem, affording high gas pressure loading on the top seal ring of the piston and, in at least one of the embodiments hereof, also affording uniform land setback and even distribution of the pressure along such ring, as will now be explained. Features, objects, and further advantages will either be specifically pointed out or become apparent when, for a better understanding of the invention, reference is made to the following description taken in conjunction with the accompanying drawings, which show certain preferred embodiments hereof and in which:

FIGURE 1 is a longitudinal, sectional, elevational showing through an operating engine cylinder, viewed from the front of an engine embodying the present invention;

FIGURE 2 is a sectional, transverse plan showing as viewed downwardly in, and taken along the section lines II—II FIGURE 1;

FIGURE 3 is a longitudinal, sectional, elevational view of the piston, shown cold and with portions of the showing of FIGURE 1 removed for clarity;

FIGURE 4 is a graph showing tendency toward carbon accumulation in the space between piston head and cylinder wall, plotted against the radial thickness of that space;

FIGURES 5–1T to 5–8T show eight pistons taken from one V–8 engine, as photographed both from the thrust (T) side and from the opposite or anti-thrust (A) side of each piston;

FIGURES 6 and 7 are respective top plan and fragmentary side elevational views of a modified piston;

FIGURE 8 is the cross-sectional view of a detail of the piston shown in FIGURE 7 and taken along the lines VIII—VIII;

FIGURE 10 is a top plan view similar to FIGURE 6, but showing another modified piston.

Figure 5:
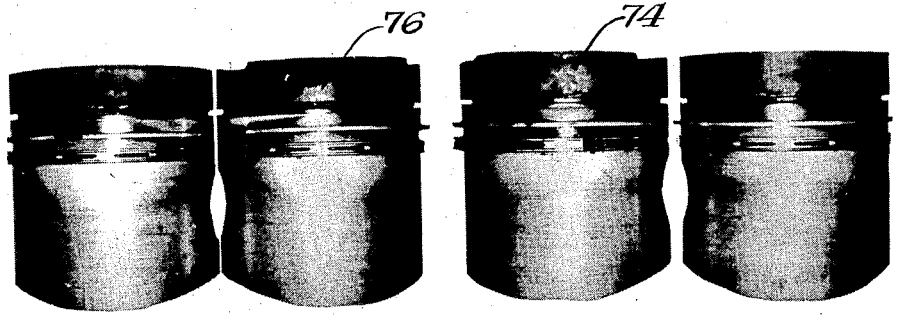
Figure 5:
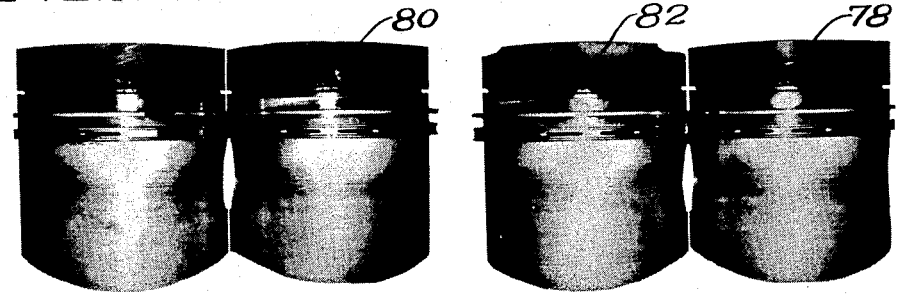

More particularly in FIGURES 1 and 2 of the drawings, the exemplary cylinder 20 of the engine as shown is specifically the No. 2 cylinder (frontmost cylinder, right bank) of a 90°, V–8 diesel engine. A head 22 at the outer end of the cylinder and a piston 24 slidably mounted in the cylinder mutually define with the cylinder a combustion chamber 26. A connecting rod 28 connects a piston pin or wrist pin 30 in conventional way to an engine crankshaft, not shown.

The piston 24 carries a second compression ring 32 and an oil control ring 34 in conventional way, and has a skirt presenting a major thrust side 36 and an anti-thrust side 38 to the wall of the cylinder 20 so as to effect the customary guiding fit therewith. The nominal cylinder bore is indicated at B, FIGURE 1.

In the immediate vicinity of, and particularly above, a top, keystone shaped compression seal ring 40 which is provided and a top, keystone shaped groove 42 which is formed in the piston and which receives the top ring, the portions of the piston are materially set back forming a setback top land 44 having a diameter of the measurement indicated at $d$ when the piston 24 is hot. An annular, gas orifice 45 thus results between the top land 44 and the wall of the cylinder 20 and between the top ring 40 and the top of the top land.

The rest of the piston 24 is conventional, incorporating the so-called Mexican hat design in the specific example illustrated. In other words, a deep combustion dish 46 is formed slightly eccentrically or else concentrically to the head, having a central upstanding cone tip 48 and being surrounded by an annular crown 50. The combustion dish 46, along with a shallow intake valve cutout 52 and a shallower exhaust valve cutout 54 (FIGURE 2) which intersect the dish, form depressions in the head which are subjected to maximum gas pressure during burning of the injected fuel, not shown, in the combustion chamber 26.

OPERATION—FIGURE 1

During the last part of the compression stroke, not illustrated, and during the firing stroke, the commencement of which is illustrated in FIGURE 1, the head of the piston 24 is subjected to the force of the explosion and combustion gas pressure is communicated freely down the orifice 45 which is ring shaped, being relatively thick and deep in cross-section. The guiding effect of the piston skirt maintains the orifice substantially uniform in radial thickness although the size is sufficient that the orifice does not appreciably pinch down in its thinnest portion due to any shift or rocking of the piston 24.

The column of gas is axially blocked by the top ring 40 and the pressure is diverted so that there is a build-up along the upper side and in the bottom of the ring groove 42. A gas loading effect results, the pneumatic force pressing radially outwardly against the ring 40 to hold it tightly in contact with the wall of the cylinder 20. The ring 40 is an ordinary split ring.

It has been observed that, at a temperature which is estimated to be 600° to 700° F., the combustion gas deposits out carbon in a state containing a lacquer-like binder which enables it to adhere both to itself and to the top land. The binder prevents the carbon from sloughing away and imparts a cohesive property whereby it takes on an identity as the so-called load-bearing, top land carbon.

In contrast to the present orifice which is not thin at once or the other side of the piston illustrated, a uniformly thin orifice about the head or an orifice which because of shifting becomes thin at one or more points establishes a constricted isolated volume tending to operate at no higher than the temperatures enumerated and being conducive to the formation and accumulation of a thick deposit of thhe load-bearing carbon.

It has also been observed, in rather striking fashion, that an exaggeratedly oversize orifice as illustrated herein at 45 minimizes or eliminates the problem caused by the burning gas depositing out load-bearing carbon, apparently for the reason that the temperature and turbulence within the orifice 45 are sufficiently high that the carbon binder decomposes and is blown away or burned without a chance to produce cohesive build-up of top land carbon.

The effective top-ring sealing that we accomplish causes, in the desired way, reduction of blow-by, reduction of top ring stickage, reduction of second ring stickage, and reduction of lubricating oil contamination and lubricating oil consumption because of better oil control. Hence, lubricating oils can successfully be used having comparatively low amounts of additives, in view of the fact that better sealing of the top ring reduces the oxidation and contamination of the boil by lowering its thickness on the wall and by reducing its residence time in the ring belt.

The load-bearing carbon elimination that we accomplish results in the desired way, in reduction of the wiping off of the hone pattern on the cylinder wall and in the reduction of top ring wear. Ring wear tends to be reduced whenever the hone pattern is sufficient to maintain the oil film necessary to lubricate the ring. With no load bearing top ring carbon present, there is no abrasive present to polish the cylinder bore smooth and so cylinder burnishing and loss of the hone pattern do not occur.

MANUFACTURE—FIGURE 3

The piston 24 is made of an aluminum alloy conventionally used for that purpose and the skirt has the usual formation of slight ellipticalness of cross-section so that, when cold, the outside diameter between the major thrust and anti-thrust sides 36 to 38 slightly exceeds the outside diameter at the pin bosses, i.e., taken across the portion of the skirt adjacent the opposite outer ends of the wrist pin 30 (FIGURE 2). Illustrated is a 4½″ piston in which the difference between the diameters at right angles to one another was in the range between 0.004″ and 0.012″, e.g., a 0.007″ cam difference.

Irrespective of the cross-sectional shape of the top land 44, at least that particular diametrical measurement thereof which is between the thrust and anti-thrust sides has a comparatively small top land diameter D (cold) prevailing substantially uniformly from top to bottom of the top land 44. Although the land 44 can be made of noncircular shape, e.g., elliptical wherein the measurement D is made along the minor axis, the top land in the piston 24 actually illustrated was ground so as to have a purely cylindrical shape, with constant diameter (cold) around, and with constant diameter from top to bottom of the land 44.

The piston 24 is formed so that D (cold) is exceeded by the nominal bore B of the receiving cylinder by a total clearance representing the sum of two clearance parameters or values. One of the values is the conventional product 0.0045″ B which is the so-called expansion clearance (cold) that takes warm-up into account. Allowing for expansion enables the aluminum piston to expand when heated without interference with or scraping against the cylinder wall which, being cast iron, has a lower coefficient of expansion and is not so heat sensitive. By way of obtaining the total clearance, we add to that one value a larger, gas loading clearance value which is a minimum of 0.060″ and certainly no less than approximately 0.040″. The consequent radial and downward gas force insures good ring sealing.

The preferred range of the gas loading clearance parameter or value in the total clearance is about 0.060″ to 0.080″, and it will be seen hereinafter that 0.061″ (diametric) has, for example, been successfully employed. A gas loading clearance value, in the total clearance, larger than 0.100″ is not only unnecessary but is undesirable in most cases because the excessive resulting total annular clearance appreciably reduces the effective combustion volume in the chamber 26 (FIGURE 1).

In one physically constructed embodiment of the invention, the engine was equipped with cast iron cylinder liners providing a nominal internal bore of 4½″ which, under present manufacturing practices, amounted to a cylinder diameter of approximately 4.501″ (cold) and 4.503″ (hot). The top land diameter D (cold) was equal to the cold bore diameter less the total clearance, which clearance equalled the sum of 0.020″ plus 0.061″. In that specific case, the measurement D (cold) was therefore the difference between 4.501″ and 0.081″, or about 4.420″ in diameter.

CARBON DEPOSIT GRAPH—FIGURE 4

It has been observed that the tendency toward accumulation of carbon deposits varies in critical relation to the piston head-cylinder wall clearance. An inspection of the deposit rate curve shown in a solid line on the graph discloses that a theoretical zero clearance between top land and cylinder would result in no carbon deposit because of zero orifice around the head of the piston, an unlikely achievement because of manufacturing toleractions and variations. The clearance conventionally sought is in the portion of the curve indicated at 56, coming as close to zero orifice clearance as practicable under manufacturing conditions.

The most beneficial clearance we have discovered is in the range indicated at 58, which in size is several multiples of the conventional clearance and which allows operation on the deposit rate curve in an area characterized by no load-bearing carbon depositing and only minor carbon depositing, the deposits of which blow away or burn away and do not tend to build up. It is to be understood that although the expansion clearance value disappears from the total setback following warm up, the gas loading clearance value endures under all engine operating conditions and insures a gas orifice of at least that thickness value at all times.

As a control, the criticality of top land clearance was demonstrated in a 250 horsepower, direct injection, four stroke cycle, V-8 diesel engine. The engine was run under specified loaded conditions after being fitted with aluminum pistons which were identical except that from piston to piston the top land clearance varied in increments of about 0.005", the nominal engine bore size being 4½". The top lands were slightly beveled, tapering upwardly in the conventional way so as to approximate a cylinder when hot. Clearances stated immediately below are in terms of total clearance from the cylinder wall.

FIGURE 5–1T is the print of a photograph taken from the thrust side and FIGURE 5–1A taken from the anti-thrust side of the No. 1 piston, in which the top land clearance (cold) at the top was 0.032" (diameter) and the top land clearance at the bottom was 0.024". The shiny deposit of top land carbon indicated at 60 on the thrust side was among the factors that interfered with proper gas pressure loading on the top ring, not shown. Although the results of poor top ring sealing are not so drastic in all cases, it so happened in the run in point that the rings of the No. 1 piston allowed gas to leak past the ring belt in sufficient quantities to heat up and overly expand the piston skirt. The piston skirt therefore crowded against the cylinder wall and became scuffed as indicated at 62 and 64 in the two figures.

FIGURE 5–2T is taken from the thrust side and FIGURE 5–2A is taken from the anti-thrust side of the No. 2 piston. The top land clearance (cold) at the top was 0.037" and at the bottom was 0.030". An amount of load-bearing carbon appears in the shiny area indicated at 66 on the anti-thrust side and a thicker amount of load-bearing carbon appears at 68 on the thrust side.

The respective anti-thrust and thrust sides of the No. 3 piston are pictured at FIGURE 5–3A and FIGURE 5–3T respectively. The anti-thrust and thrust sides of the No. 4 piston are illustrated in FIGURES 5–4A and 5–4T respectively. In comparison to the extensive top land carbon appearing in the shiny area 70 on the thrust side of No. 3 piston, it will be seen that the load-bearing carbon is starting to burn away on the thrust side of piston No. 4 so that the shiny carbon area at 72 on the latter is of reduced value. Piston No. 3 had a top land clearance (cold) of 0.042" at the top and a clearance of 0.034" at the bottom. Piston No. 4 had a top land clearance (cold) of 0.047" at the top and a clearance of 0.039" at the bottom.

The anti-thrust side of piston No. 5 is pictured in FIGURE 5–5A and the thrust side is pictured in FIGURE 5–5T, wherein the load-bearing carbon appears shiny in its deposited areas such as at 74. The top land clearance was 0.052" at the top and 0.044" at the bottom.

The anti-thrust and thrust sides of piston No. 6 are pictured respectively in FIGURES 5–6A and 5–6T, wherein carbon reduction shows comparative improvement except in the shiny area 76 on the anti-thrust side, and the anti-thrust and thrust sides of the No. 7 piston are pictured in FIGURES 5–7A and 5–7T, respectively, and show further carbon reduction improvement. The top land clearance (cold) of No. 6 piston was 0.058" at the top and 0.050" at the bottom, and clearance of the No. 7 piston was 0.062" at the top and 0.054" at the bottom.

The No. 8 piston was ground with the largest increment of clearance in the range employed, the top land clearance at the top being 0.067" and at the bottom being 0.059". The thrust side of the piston is pictured in FIGURE 5–8T wherein the sole deposit is black soot such as appears at 78. The anti-trust side is pictured at FIGURE 5–8A and, again, only soot appears. The curious white spot indicated at 80 is a smear of oil inadvertently applied to the piston during handling.

The soot referred to almost entirely if not wholly so, is carbon soot having so little clinging power that it can be wiped from the land by hand. The carbon soot does not accumulate to any extent, it is not a load-bearing carbon, and in fact it vanishes from time to time leaving vacated areas such as indicated at 82 in FIGURE 5–7T.

If the top land setback is eliminated from the illustrated piston, which piston has the cylindrical land with constant radius, or eliminated from the suggested piston, which has the elliptical land in which the setback providing diameter D falls along the minor axis of the ellipse, other means can be provided effective to communicate explosion gas for pressure loading the top ring and at the same time effective to increase the effective combustion volume of the chamber 26, but the more nearly uniform gas loading and the enhanced improvement in top land carbon control will not be achieved to the present pronounced extent.

On such means is illustrated in FIGURES 6, 7, and 8, in which orifice means on the piston is provided by shallow but wide slots that are formed in the surface of a conventional tapered top land (cold) so as to extend longitudinally between the top of the land and the upper side wall of the conventional top ring groove 86. The piston is otherwise conventional and is indicated at 88. Four slots have been employed, each measuring 0.500" wide and 0.050" deep in a 4½" piston.

Figure 9:
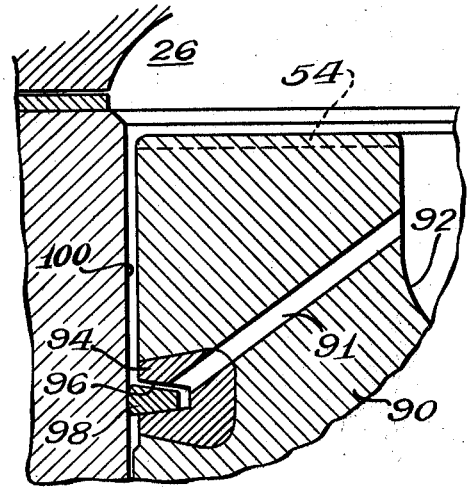
FIGURE 9 is a sectional, detail view similar to FIGURE 8, but showing another modification.

Another orifice means is illustrated in FIGURE 9, which offers the advantage of direct loading of the top ring but which at the same time may contribute more to surface cracking and burning than the land slots just described. Specifically, a plurality of holes provided in an otherwise conventional piston 90 forms therein gas passages 91, e.g., four such passages, leading directly and diagonally from the combustion dish 92 through the crown, and thence through the ring insert 94 and into the upper side wall and bottom of a ring groove 96. A ring 98 in the groove is thus gas loaded from the inner side so as to be radially forced into firm sealing contact with the wall of the confronting engine cylinder 100. The preferable axis of the passages 91 is a straight one, and forms an acute vertical angle (i.e., with the piston axis) which is of the general order of, but no less than, approximately 50° and had the preferred value, in one embodiment, of 54°.

Figure 11:
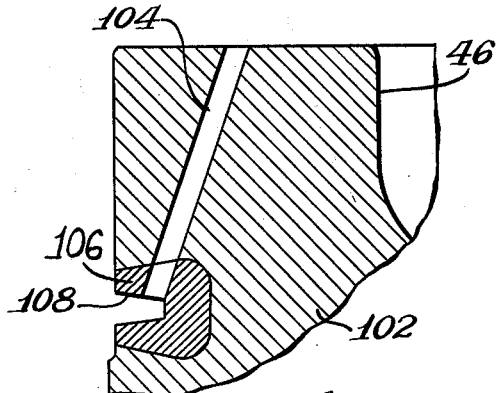
FIGURE 11 is a sectional view showing a detail of the piston shown in FIGURE 10 and taken along the lines XI—XI.

Further means is shown in the embodiment of FIGURES 10 and 11, in which four holes in the crown of an otherwise conventional piston 102 form passages 104 for gas leading downwardly and diagonally outwardly through a conventional ring insert 106 to the upper wall of a top ring groove 108 formed in the insert. A plurality of the passages is specially designated 104a, each of which leads from the surface depression formed by one or the other of the valve cutouts indicated at 52 (intake) and 54 (exhaust) in the crown of the piston 102. The advantage of the passages, particularly the passages 104a, is that full explosion pressure is communicated directly to the top ring, not shown. In contrast, however, the previously described mode of communicating pressure through constant depth surface slots in the top land has the benefit of greater freedom from hot gas erosion problems which can develop at the mouth of holes in the head of a piston.

Four holes leading to the top ring groove of a 4½" piston have been found satisfactory, the hole size was ⅛" diameter, and, in the embodiment of FIGURE 11, for example, the axis of each diagonal passage 104 when extended intersected the longitudinal axis of the piston 102 at an angle of approximately 20°.

Variations within the spirit and scope of the invention described are equally comprehended by the foregoing description.

What is claimed is:

1. Piston for use in the cylinder of an engine of nominal bore B, having thrust and anti-thrust sides, having a number of ring grooves, and having that number of piston rings therein, and lands alternating with the rings and including a top land intersecting the top groove at its upper side and having a location immediately above the top ring, said top land having at least that diametrical measurement thereof which is between the thrust and anti-thrust sides to have a relatively small top land diameter D which is substantially uniform from top to bottom of the top land, said piston consisting of a diesel piston characterized by the improvement of:

B exceeding D (cold) by about 0.0045" B expansion clearance plus a gas loading clearance approximately in the range between 0.040" and 0.100".

2. The invention of claim 1, characterized by the top land (cold) having a substantially constant diameter throughout 360° uniformly from top to bottom thereof.

3. The invention of claim 2, in combination with the receiving cylinder of diameter B in said engine, and characterized by:

the average radial thickness dimension (cold) of the generally annular gas orifice between the top land and the wall of the cylinder and between the top ring and the top of the top land being approximately half the sum of the product of 0.0045" B plus a gas loading clearance in the range between 0.060" and 0.080", whereby a substantial size gas orifice is present around the piston to insure communication of firing pressure to the top ring when the parts expand and operate under the loaded running temperatures of the engine.

4. The invention of claim 2, characterized by the piston being an aluminum containing piston with boss sides and thrust and anti-thrust sides, and comprising a skirt having a first diameter between the thrust and anti-thrust sides and a second diameter of the skirt across the piston pin bosses, said first diameter exceeding the second diameter by a difference approximately in the range between 0.004" and 0.012".

5. The invention of claim 2, characterized by the diesel piston being aluminum or an aluminum alloy.

6. The invention of claim 1, characterized by the diesel piston being aluminum or an aluminum alloy.

References Cited

UNITED STATES PATENTS

| | | |
|---|---|---|
| 1,275,064 | 8/1918 | Mason et al. |
| 1,523,572 | 1/1925 | Agard _____ 92—182 X |
| 2,610,098 | 9/1952 | Reiners _____ 92—182 |
| 2,845,917 | 8/1958 | Laubender. |
| 3,134,306 | 5/1964 | Schmidt _____ 92—209 |
| 3,152,523 | 10/1964 | Whitfield et al. ___ 123—193 X |
| 3,357,318 | 12/1967 | Packard et al. ____ 123—193 X |

CARROLL B. DORITY, JR., Primary Examiner

U.S. Cl. X.R.

92—182, 208